United States Patent
Dudar et al.

(10) Patent No.: US 10,759,652 B2
(45) Date of Patent: Sep. 1, 2020

(54) VEHICLE FUEL DELIVERY

(71) Applicant: Ford Global Technologies, LLC, Dearborn, MI (US)

(72) Inventors: Aed M. Dudar, Canton, MI (US); Kenneth James Miller, Canton, MI (US); Thomas G. Leone, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 198 days.

(21) Appl. No.: 15/683,249

(22) Filed: Aug. 22, 2017

(65) Prior Publication Data

US 2019/0062143 A1 Feb. 28, 2019

(51) Int. Cl.
| | |
|---|---|
| *G06K 9/00* | (2006.01) |
| *B67D 7/32* | (2010.01) |
| *G07F 15/04* | (2006.01) |
| *G06T 7/70* | (2017.01) |
| *G06K 9/46* | (2006.01) |
| *G06Q 20/14* | (2012.01) |
| *G06T 7/00* | (2017.01) |
| *G07F 13/02* | (2006.01) |
| *B60K 15/03* | (2006.01) |

(52) U.S. Cl.
CPC ......... *B67D 7/3209* (2013.01); *B67D 7/3218* (2013.01); *G06K 9/00771* (2013.01); *G06K 9/00791* (2013.01); *G06K 9/4652* (2013.01); *G06Q 20/145* (2013.01); *G06T 7/0002* (2013.01); *G06T 7/70* (2017.01); *G07F 13/025* (2013.01); *G07F 15/04* (2013.01); *B60K 2015/03197* (2013.01); *B60K 2015/03203* (2013.01); *B60K 2015/03342* (2013.01); *B60K 2015/03361* (2013.01); *G06T 2207/10024* (2013.01); *G06T 2207/10048* (2013.01); *G06T 2207/30248* (2013.01)

(58) Field of Classification Search
CPC .................. G06Q 50/06; B67D 7/0401; B67D 2007/0463; B67D 2007/0473; B67D 7/04; B67D 7/3209; G06K 9/00624; G06K 9/4652

See application file for complete search history.

(56) References Cited

U.S. PATENT DOCUMENTS

| | | | | |
|---|---|---|---|---|
| 5,383,500 A | * | 1/1995 | Dwars .................. | B67D 7/0401 141/98 |
| 6,237,647 B1 | * | 5/2001 | Pong .................... | B67D 7/0401 141/231 |
| 6,269,848 B1 | * | 8/2001 | Corfitsen ............. | B67D 7/0401 141/94 |

(Continued)

FOREIGN PATENT DOCUMENTS

| | | |
|---|---|---|
| DE | 102005002245 A1 | 7/2006 |
| DE | 102011088167 A1 | 6/2013 |

(Continued)

*Primary Examiner* — Guillermo M Rivera-Martinez
(74) *Attorney, Agent, or Firm* — Frank A. MacKenzie; Bejin Bieneman PLC (57) ABSTRACT

Data are received indicating an amount of pumped fuel provided to a vehicle fuel tank. A vehicle fuel tank fuel volume is received. Upon determining that a difference between the pumped amount of fuel and a detected change in a fuel volume in the fuel tank exceeds a threshold, a fuel pump is deactivated.

20 Claims, 5 Drawing Sheets

(56) References Cited

U.S. PATENT DOCUMENTS

| | | | |
|---|---|---|---|
| 6,382,269 B1* | 5/2002 | Tatsuno | B67D 7/0401 141/104 |
| 7,938,321 B2 | 5/2011 | Harrell | |
| 8,393,362 B1 | 3/2013 | Hollerback | |
| 2002/0008637 A1* | 1/2002 | Lemelson | G08G 1/07 340/907 |
| 2002/0096226 A1* | 7/2002 | Strnad | B67D 7/0401 141/94 |
| 2006/0208169 A1* | 9/2006 | Breed | B60N 2/002 250/221 |
| 2007/0265733 A1* | 11/2007 | Harrell | G07F 13/025 700/283 |
| 2011/0139130 A1* | 6/2011 | Siddiqui | F02M 25/0818 123/520 |
| 2013/0211976 A1* | 8/2013 | Breed | G06Q 10/06 705/28 |
| 2014/0195045 A1* | 7/2014 | McQuade | H04L 9/3215 700/237 |
| 2015/0213299 A1 | 7/2015 | Solano Ferrandez et al. | |
| 2015/0242855 A1* | 8/2015 | Vilnai | B67D 7/34 705/44 |
| 2016/0039656 A1* | 2/2016 | Walsh | B67D 7/78 700/283 |
| 2016/0055653 A1* | 2/2016 | Badawy | G06T 7/90 348/143 |
| 2016/0101734 A1 | 4/2016 | Baek | |
| 2016/0240021 A1* | 8/2016 | Ryu | G07C 5/08 |
| 2017/0308965 A1* | 10/2017 | Morris | B67D 7/04 |
| 2017/0355081 A1* | 12/2017 | Fisher | G08B 21/20 |
| 2018/0215043 A1* | 8/2018 | Michalakis | B25J 5/007 |
| 2018/0229660 A1* | 8/2018 | Sugano | B60R 1/12 |

FOREIGN PATENT DOCUMENTS

| | | |
|---|---|---|
| EP | 2949620 A1 | 12/2015 |
| JP | H6273255 A | 9/1994 |

* cited by examiner

VEHICLE FUEL DELIVERY

BACKGROUND

Vehicles can include a fuel tank to store liquid fuel. A user can refill the fuel tank at a fueling station. The fuel pump can connect to the fuel tank to pump fuel into the fuel tank. While the fuel pump is filling the fuel tank, fuel may spill from the fuel pump to an area near the vehicle. Spills can be hazardous and/or expensive. It is a problem that spills can go undetected.

DETAILED DESCRIPTION

A system includes computer programmed to receive data indicating an amount of pumped fuel provided to a vehicle fuel tank, receive a vehicle fuel tank fuel volume, and, upon determining that a difference between the amount of pumped fuel and the vehicle fuel tank volume exceeds a threshold, deactivate a fuel pump.

The computer can be further programmed to actuate a vehicle image sensor to provide image data for an area at a refueling side of the vehicle and, upon identifying a fuel spill from the image data, deactivate the fuel pump.

The computer can be further programmed to identify the fuel spill based on the image data by identifying a color difference on a roadway surface greater than a color difference threshold. The computer can be further programmed to, upon identifying the fuel spill, actuate the vehicle to move away from the fuel spill. The computer can be further programmed to obtain thermal image data from the image sensor.

The computer can be further programmed to identify the fuel spill when the thermal image data indicate a temperature difference on a roadway surface greater than a temperature difference threshold. The computer can be further programmed to measure an ambient air temperature and to identify the fuel spill based on the thermal image data and the ambient air temperature.

The computer can be further programmed to disengage the fuel pump from the fuel tank upon deactivating the fuel pump.

The computer can be further programmed to instruct a side mirror to move toward a vehicle door.

The computer can be further programmed to identify a fuel door with the image sensor and actuate the vehicle image sensor to provide image data for an area within a predetermined distance of the fuel door.

A method includes receiving data indicating an amount of pumped fuel provided to a vehicle fuel tank, receiving a vehicle fuel tank fuel volume, and, upon determining that a difference between the pumped amount of fuel and a detected change in a fuel volume in the fuel tank exceeds a threshold, deactivating a fuel pump.

The method can further include actuating a vehicle image sensor to provide image data for an area at a refueling side of the vehicle and, upon identifying a fuel spill from the image data, deactivating the fuel pump.

The method can further include identifying the fuel spill based on the image data by identifying a color difference on a roadway surface greater than a color difference threshold. The method can further include, upon identifying the fuel spill, actuating the vehicle to move away from the fuel spill. The method can further include obtaining thermal image data from the image sensor.

The method can further include identifying the fuel spill when the thermal image data indicate a temperature difference on a roadway surface greater than a temperature difference threshold. The method can further include measuring an ambient air temperature and identifying the fuel spill based on the thermal image data and the ambient air temperature.

The method can further include disengaging the fuel pump from the fuel tank upon deactivating the fuel pump.

The method can further include instructing a side mirror to move toward a vehicle door.

The method can further include identifying a fuel door with the image sensor and actuating the vehicle image sensor to provide image data for an area within a predetermined distance of the fuel door.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in a vehicle can detect a fuel spill near a vehicle fuel door. The computer can actuate an image sensor to capture images near the fuel door. The computer can determine whether the images show a fuel spill. Upon detecting the fuel spill, the computer can instruct a fuel pump to stop fueling the vehicle and can move the vehicle away from the fuel spill. By using image data to detect the fuel spill, the computer can detect fuel spills without input from a human operator.

Figure 1:
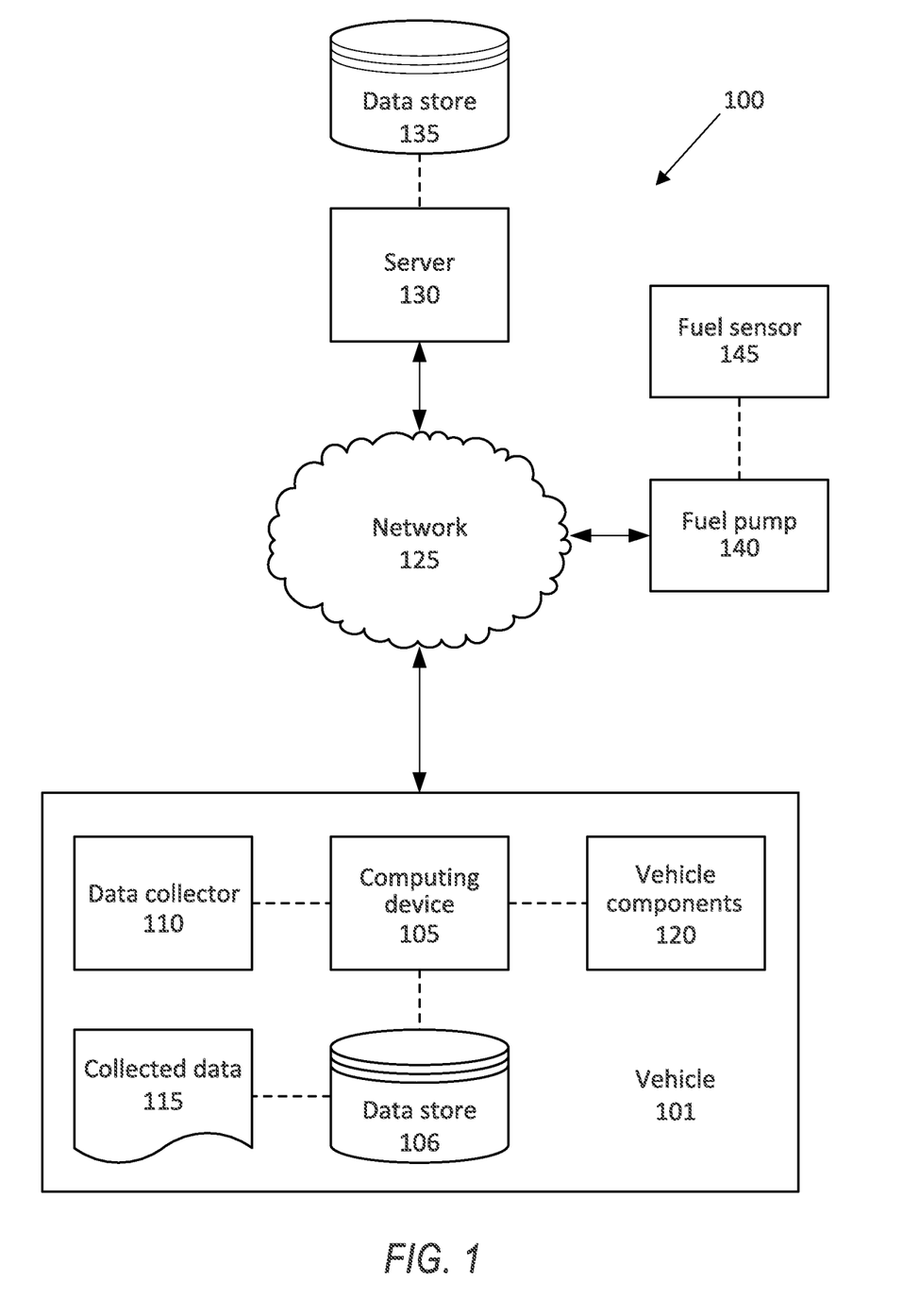
FIG. 1 is a block diagram of an example system for refueling a vehicle.

FIG. 1 illustrates an example system 100 for refueling a vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of an object, determining the presence of a user, etc. The sensors 110 could also include short range radar, long range radar, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

When the computing device 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computing device 105. A semi-autonomous mode is one in which at least one of vehicle 101 propulsion (typically via a powertrain including an electric motor and/or internal combustion engine), braking, and steering are controlled at least partly by the computing device 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes a fuel pump 140. The fuel pump 140 can communicate over the network 125 with the computer 105. The fuel pump 140 can provide fuel to the vehicle 101. The fuel pump 140 can include a fuel sensor 145. The fuel sensor 145 can detect a volume of fuel pumped to the vehicle 101. The fuel pump 140 can communicate the volume of fuel detected by the fuel sensor 145 to the computer 105.

Figure 2:
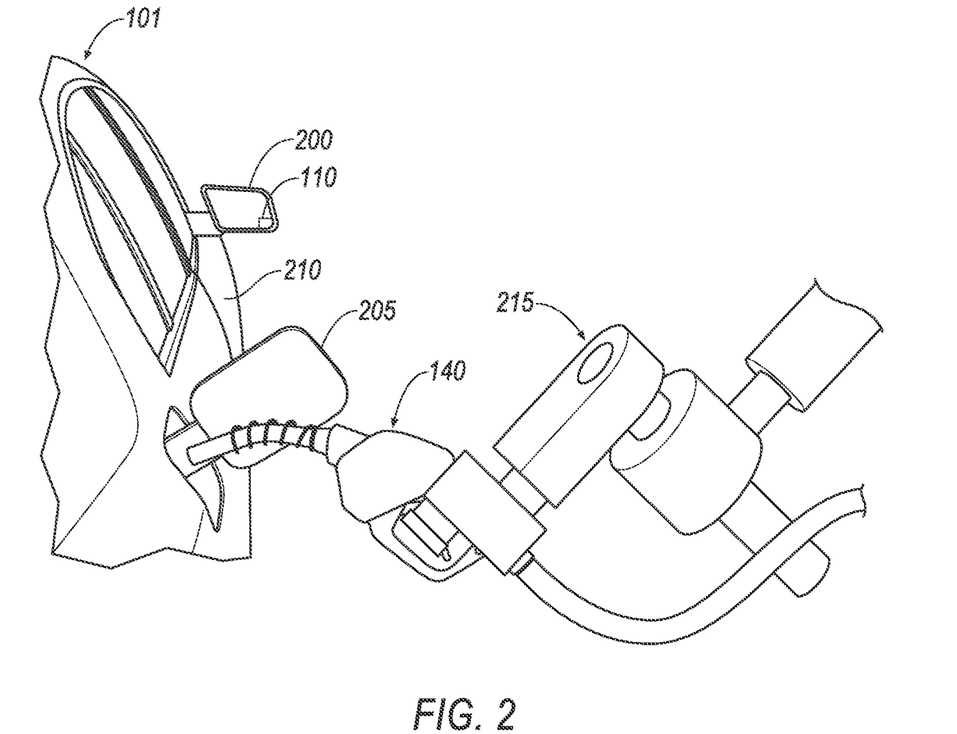
FIG. 2 illustrates a fuel pump attached to the vehicle.

FIG. 2 illustrates an example vehicle 101 at a fuel pump 140. The vehicle 101 can include a side mirror 200. The side mirror can reflect a side of the vehicle 101 for a user of the vehicle 101. The side mirror 200 can include a sensor 110, e.g., an image sensor 110, to collect image data 115 from an area along the side of the vehicle 101.

The vehicle 101 can include a fuel door 205 and a fuel line (not shown) connected to a fuel tank (not shown). The fuel pump 140 can be positioned past the fuel door 205 to pump fuel through the fuel line to the fuel tank. When the fuel pump 140 is positioned to pump fuel to the fuel line, the fuel pump 140 is "engaged" with the vehicle 101. When the fuel pump 140 is positioned away from the fuel line, the fuel pump 140 is "disengaged" with the vehicle 101.

The computer 105 can instruct the side mirror 200 to move toward a vehicle door 210. The side mirror 200 can include a motor (not shown) that can rotate the side mirror toward and away from the vehicle door 210. The computer 105 can instruct the side mirror 200 to rotate toward the vehicle door 210 such that the image sensor 110 can capture an image that includes the fuel pump 140, the fuel door 205, and/or an area around the fuel door 205 to detect the fuel spill.

The computer 105 can be programmed to disengage the fuel pump 140 from the fuel tank. The fuel pump 140 can include an autonomous movement apparatus 215 including one or more actuators and/or movable arms that can be programmed to position the fuel pump 140 in the fuel tank of the vehicle 101. The computer 105 can communicate with the apparatus 215 to move the fuel pump 140 from the vehicle 101 upon detecting a fuel spill. Furthermore, the computer 105 can instruct the fuel pump 140 to disengage from the fuel tank when fueling is complete, i.e., the fuel tank sensor 110 indicates that the fuel tank is above a fuel tank threshold.

The computer 105 can be programmed to detect the fuel spill based on a fuel volume in the fuel tank and a pumped amount of fuel from the fuel pump 140. The computer 105 can communicate with the fuel pump processor 145 and receive data 115 about the pumped amount of fuel from the fuel pump 140. The computer 105 can further receive data 115 from a sensor 110 in the fuel tank on the fuel volume in the fuel tank. The computer 105 can determine a difference between the pumped amount of fuel and a detected change in a fuel volume in the fuel tank. Upon determining that the difference between the pumped amount of fuel and a detected change in a fuel volume in the fuel tank exceeds a threshold, the computer 105 can deactivate the fuel pump 140.

Figure 3:
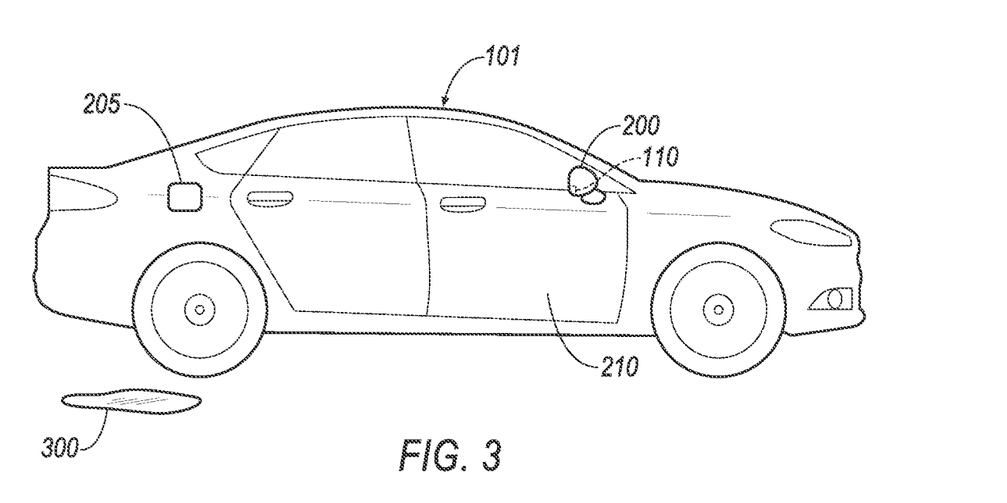
FIG. 3 illustrates a sensor detecting a fuel spill.

FIG. 3 illustrates an example fuel spill 300 detected by image data 115 collected by an image sensor 110. The computer 105 can be programmed to actuate the image sensor 110 on the side mirror 200 to collect data 115 around the fuel door 205. Prior to the start of fueling, the image sensor 110 can capture a first image of the area around the fuel door. While the fuel pump 140 is fueling the vehicle 101, the image sensor can capture a second image of the area around the fuel door 205. The computer 105 can, using known image processing techniques, compare the first image and the second image to determine whether the second image differs from the first image. For example, the computer 105 can identify portions of second image that contain colors not present in the first image, e.g., a polychromatic portion from a gasoline spill. Each image can have an average color value, the average color value being an arithmetic average of the red, green, and blue (RGB) numerical values of the pixels of the respective image. Liquid fuel, such as gasoline, can reflect more colors of light than a surrounding roadway, increasing the RGB values in the second image. Thus, when the second image includes the fuel spill 300, the average color value can be greater than the average color value for the first image without the fuel spill 300.

The computer 105 can be programmed to identify the fuel door 205 with the image sensor 110. The computer 105 can capture an image of the side of the vehicle 101. The computer 105 can compare the image to a stored image of the fuel door 205 in the data store 106 and/or the server 130. The computer 105 can, using known image processing techniques, identify the fuel door 205 in the captured image. The computer 105 can then actuate the image sensor 110 to provide image data 115 for an area within a predetermined distance of the fuel door 205.

The fuel spill 300 can be detected by thermal image data 115 from a thermal image sensor 110. The computer 105 can be programmed to collect data 115 about an ambient temperature with a temperature sensor 110. The thermal image sensor 110 can collect infrared data 115 and, using known image processing techniques, map the infrared data 115 to a color image, i.e., the color value of a portion of the image can correspond to a specific temperature and/or temperature range.

The computer 105 can capture a first image of the area around the fuel door 205 prior to the start of fueling. The area can be a field of view of the image sensor 110 that includes the fuel door 205. For example, the image sensor 110 can determine the area around the fuel door 205 as the field of view of the image sensor 110 when the image of the fuel door 205 is projected to be within a predetermined distance of the center of the image captured by the image sensor 110. The computer 105 can move the side mirror 200 until the fuel door 205 is within the predetermined distance of the center of the image. The area can be a field of view that extends up to a predetermined distance from the fuel door 205, determined using image processing techniques such as are known.

While the fuel pump 140 is fueling the vehicle 101, the thermal image sensor 110 can capture a second image of the area around the fuel door 205. The computer 105 can, using known image processing techniques, determine a temperature difference between the first image and the second image based on the thermal image data 115. If the temperature difference is greater than a temperature difference threshold, the computer 105 can determine that a fuel spill 300 has occurred. The temperature difference threshold can be a predetermined value based on known thermal properties of the liquid fuel and stored in the data store 106 and/or the server 130. The thermal properties can include, e.g., heat capacity, density, viscosity, boiling temperature, specific heat, etc. For example, because the fuel can absorb thermal energy from the roadway and be cooler than the roadway, the temperature difference threshold can be based on a predicted difference between a predicted temperature of spilled fuel onto the roadway and a predicted temperature of the roadway without fuel, the predicted temperature of the fuel based on the fuel heat capacity and the predicted temperature of the roadway based on the heat capacity of the roadway surface. The predicted temperature of the spilled fuel can be further based on the specific heat and the boiling temperature of the fuel. Furthermore, the computer 105 can compare the image data 115 of one portion of the second image to the image data 115 of another portion of the second image to determine whether a fuel spill has occurred. For example, if a portion of the second image has a temperature difference with another portion of the second image that is greater than the temperature difference threshold, the computer 105 can determine that a fuel spill 300 has occurred.

Furthermore, the computer 105 can compare the thermal image data 115 to the ambient temperature data 115. The ambient temperature can be an air temperature, and a temperature of a liquid fuel spill 300 can differ from the ambient temperature. For example, the fuel temperature can be approximately 55 degrees Fahrenheit (i.e., a temperature of an underground station fuel tank), and when the computer 105 determines that a portion of the thermal image data 115 in the second image is one of greater than the ambient temperature (when the ambient temperature is below 55° F. plus a threshold based on thermal properties of the fuel, e.g., the heat capacity of the fuel) or less than the ambient temperature (when the ambient temperature is above 55° F. plus a threshold based on the thermal properties of the fuel, e.g., the heat capacity of the fuel), the computer 105 can determine that a fuel spill 300 has occurred.

The computer 105 can direct the image sensor 110 to detect the fuel spill 300. As described above, the computer 105 can move the side mirror 200 until the image sensor 110 is positioned to capture an image of the fuel door 205 and an area around the fuel door 205. The computer 105 can position the image sensor 200 to a predetermined position, or the computer 105 can, upon capturing a first image, move the image sensor 200 until the image sensor 200 can capture another image including an area around the fuel door 205.

The computer 105 can be programmed to, upon identifying the fuel spill 300, actuate one or more components 120 of the vehicle 101 to move away from the fuel spill 300. The computer 105 can actuate the propulsion 120 and the steering 120 to propel the vehicle 101 and steer the vehicle 101 away from the fuel spill 300. Thus, the computer 105 can prevent fuel from the fuel spill 300 from splashing onto the exterior of the vehicle 101.

Figure 4:
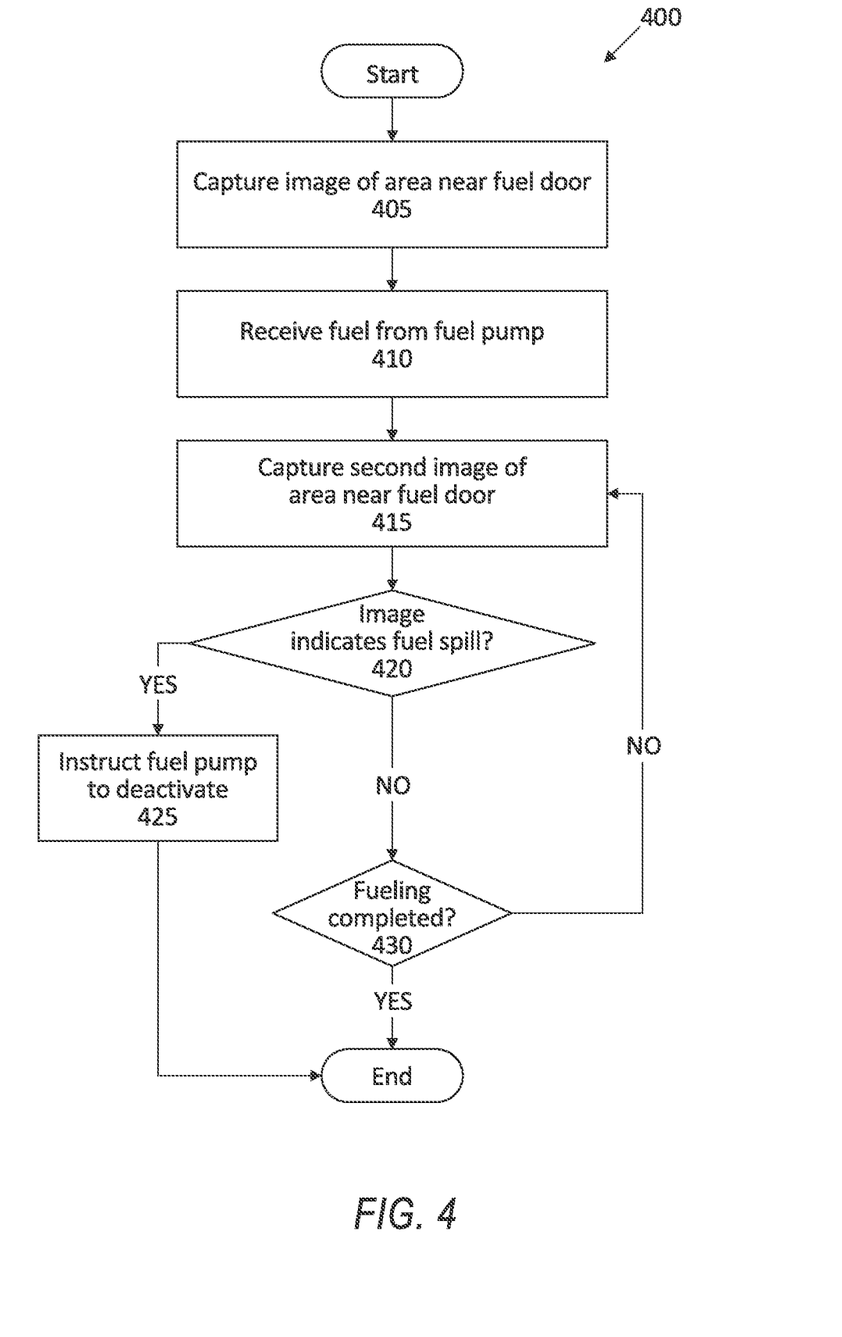
FIG. 4 illustrates an example process for detecting the fuel spill based on image data.

FIG. 4 illustrates an example process 400 for detecting a fuel spill 300. The process 400 begins in a block 405, in which the computer 105 instructs an image sensor 110 collects a first image of an area around a fuel door 205 prior to activating a fuel pump 140. The first image prior to pumping fuel can provide a baseline from which to compare a second image to detect a fuel spill 300.

Next, in a block 410, the computer 105 activates the fuel pump 140 and receives fuel. The computer 105 can communicate with the fuel pump 140 to begin pumping fuel into the fuel tank. The fuel pump 140 pumps fuel through the fuel line and into the fuel tank.

Next, in a block 415, the computer 105 captures a second image with the image sensor 110 from the side of the vehicle 101. As described above, the second image can include the fuel pump 140. The computer 105 can capture the second image while the fuel pump 140 is pumping fuel into the fuel tank. The second image can include an area within a predetermined distance of the fuel door 210.

Next, in a block 420, the computer 105 compares the second image to the first image to detect a fuel spill 300. As described above, the computer 105 can use known image processing techniques to determine a color difference between the first image and the second image. Each image can have an average color value, the average color value being an arithmetic average of the red, green, and blue (RGB) numerical values of the pixels of the respective image. If the color difference is greater than a color difference threshold, the computer 105 can determine that the color difference represents spilled fuel, and the computer 105 can detect a fuel spill 300. Alternatively, the computer 105 can compare thermal data 115 from the first image and the second image to determine a temperature difference. If the temperature difference is above a temperature difference threshold, the computer 105 can determine that a fuel spill 300 has occurred. If the computer 105 detects the fuel spill 300, the process 400 continues in a block 425. Otherwise, the process 400 continues in a block 430.

In the block 425, the computer 105 instructs the fuel pump 140 to deactivate. Upon deactivating, the fuel pump 140 stops pumping fuel to the vehicle 101. The computer 105 can further instruct the fuel pump 140 to disengage from the fuel tank, as described above. Further still, the computer 105 can actuate one or more components 120 to move the vehicle 101 away from the fuel spill 300. Following the block 425, the process 400 ends.

In the block 430, the computer 105 determines whether the fueling has been completed. The computer 105 can collect data 115 from the fuel level sensor 110 to determine whether to receive more fuel from the fuel pump 140. If the computer 105 determines that the fueling has completed, the process 400 ends. Otherwise, the process 400 returns to the block 415 to capture another image.

Figure 5:
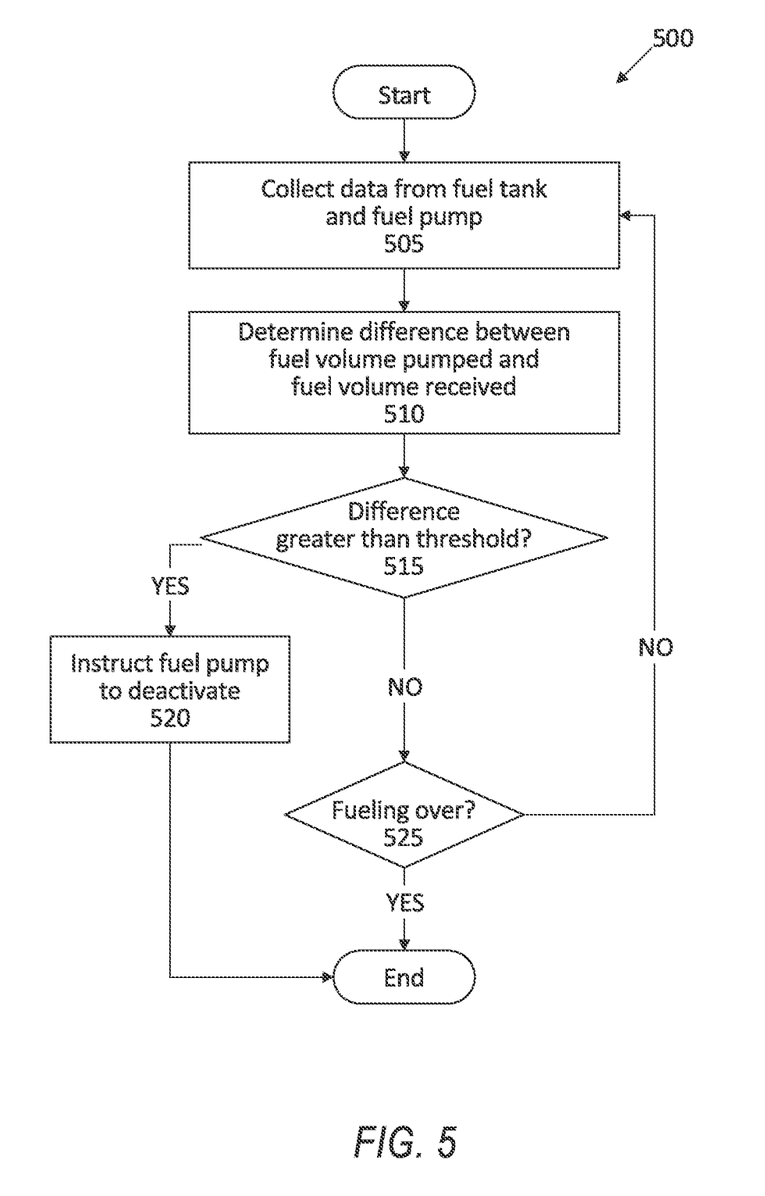
FIG. 5 illustrates an example process for detecting the fuel spill based on data from the fuel pump.

FIG. 5 illustrates an example process 500 for refueling a vehicle 101. The process 500 starts in a block 505, in which the computer 105 collects data 115 from the fuel tank and the fuel pump 140 as the fuel pump 140 pumps fuel into the fuel tank. The computer 105 can collect data 115 about a volume of fuel received by the fuel tank and a volume of fuel pumped by the fuel pump 140.

Next, in a block 510, the computer 105 determines a difference between the volume of fuel received by the fuel tank and the volume of fuel pumped by the fuel pump 140. The computer 105 can compare the data 115 collected by the sensors 110 and received from the fuel pump 140 to determine the difference.

Next, in a block 515, the computer 105 determines whether the difference is greater than a threshold. The threshold can be a predetermined value stored in the data store 106 and/or the server 130. The threshold can be established based on a predicted fuel loss from a fuel spill 300 and/or a measurement resolution of the fuel level sensor 110. If the difference is greater than the threshold, the computer 105 can determine that the fuel that the fuel pump 140 indicates has been pumped but the fuel tank indicates has not been received has been spilled as a fuel spill 300. If the difference is greater than the threshold, the process 500 continues in a block 520. Otherwise, the process 500 continues in a block 525.

In the block 520, the computer 105 instructs the fuel pump 140 to deactivate. The computer 105 can communicate over the network 125 with the fuel pump processor 145 to stop pumping fuel and prevent more fuel from spilling. Following the block 520, the process 500 ends.

In the block 525, the computer 105 determines whether the fueling has been completed. The computer 105 can collect data 115 from the fuel level sensor 110 to determine whether to receive more fuel from the fuel pump 140. If the computer 105 determines that the fueling has completed, the process 500 ends. Otherwise, the process 500 returns to the block 505 to collect more data 115.

Figure 6:
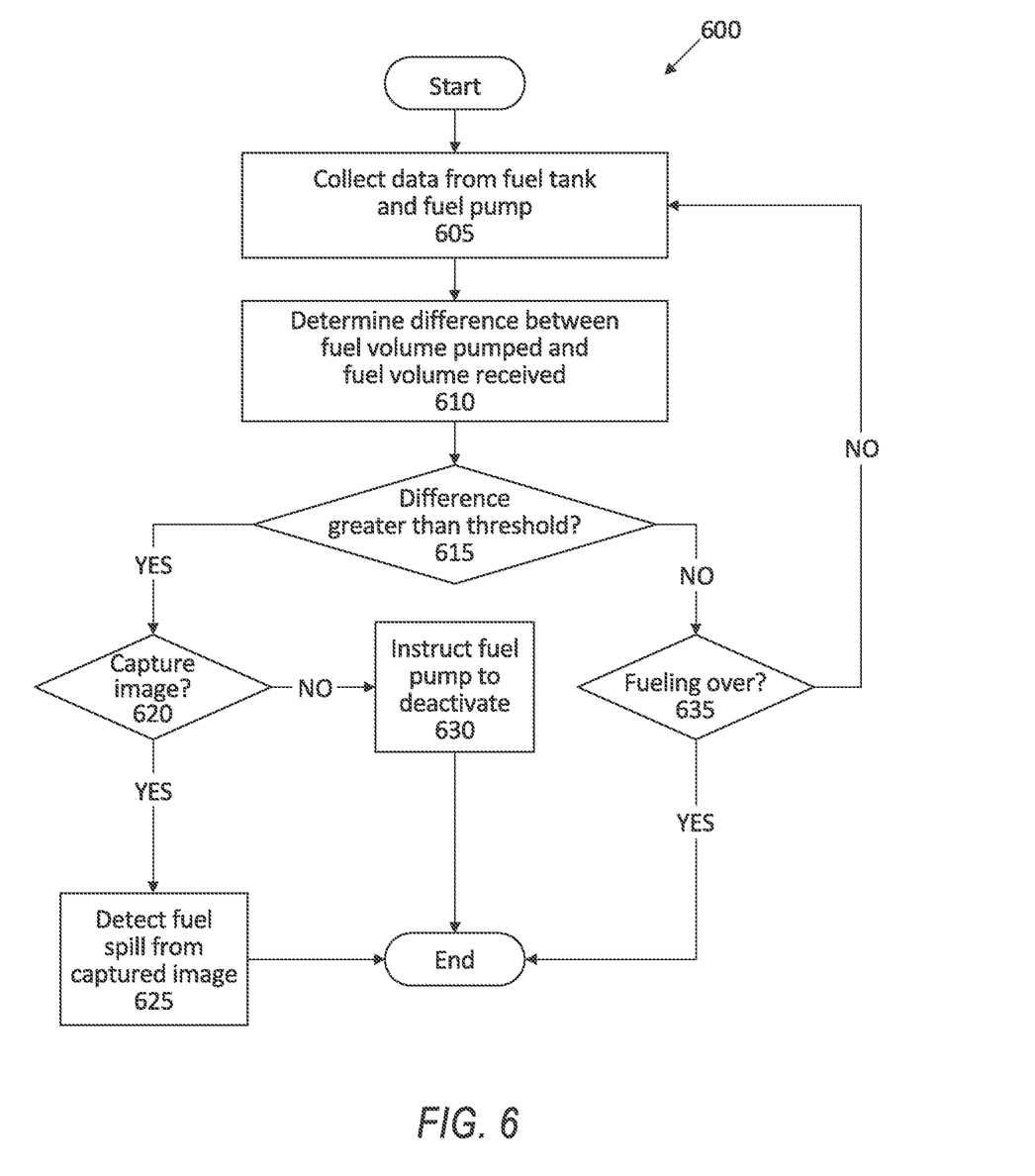
FIG. 6 illustrates an example process for detecting the fuel spill based on data from the fuel pump and the image data.

FIG. 6 illustrates another example process 600 for refueling a vehicle 101. The process 600 starts in a block 605, in which the computer 105 collects data 115 from the fuel tank and the fuel pump 140 as the fuel pump 140 pumps fuel into the fuel tank. The computer 105 can collect data 115 about a volume of fuel received by the fuel tank and a volume of fuel pumped by the fuel pump 140.

Next, in a block 610, the computer 105 determines a difference between the volume of fuel received by the fuel tank and the volume of fuel pumped by the fuel pump 140. The computer 105 can compare the data 115 collected by the sensors 110 and received from the fuel pump 140 to determine the difference.

Next, in a block 615, the computer 105 determines whether the difference is greater than a threshold. The threshold can be a predetermined value stored in the data store 106 and/or the server 130. The threshold can be established based on a predicted fuel loss from a fuel spill 300 and/or a measurement resolution of the fuel level sensor 110. If the difference is greater than the threshold, the computer 105 can determine that the fuel that the fuel pump 140 indicates has been pumped but the fuel tank indicates has not been received has been spilled as a fuel spill 300. If the difference is greater than the threshold, the process 600 continues in a block 620. Otherwise, the process 600 continues in a block 625.

In the block 620, the computer 105 determines whether to capture an image to detect the fuel spill 300. As described above in the process 400, the computer 105 can detect the fuel spill 300 with a captured image from the image sensor 110 and determine to deactivate the fuel pump 140 upon detecting the fuel spill 300. If the computer 105 decides to capture the image with the image sensor 110, the process 600 continues in a block 625. Otherwise, the process continues in a block 630.

In the block 625, the computer 105 captures an image with the image sensor 110 to detect the fuel spill 300. The computer 105 can detect the fuel spill 300, e.g., according to the process 400 described above. Following the block 625, the process 600 ends.

In the block 630, the computer 105 instructs the fuel pump 140 to deactivate. The computer 105 can communicate over the network 125 with the fuel pump processor 145 to stop pumping fuel and prevent more fuel from spilling. Following the block 630, the process 600 ends.

In the block 635, the computer 105 determines whether the fueling has been completed. The computer 105 can collect data 115 from the fuel level sensor 110 to determine whether to receive more fuel from the fuel pump 140. If the computer 105 determines that the fueling has completed, the process 600 ends. Otherwise, the process 600 returns to the block 605 to collect more data 115.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising computer programmed to:
receive data indicating an amount of pumped fuel provided to a vehicle fuel tank of a vehicle while a fuel pump external to the vehicle provides fuel to the vehicle fuel tank;
detect a change in a fuel volume of the vehicle fuel tank; and
upon determining that a difference between the amount of pumped fuel and the detected change exceeds a threshold, then, deactivate the fuel pump.

2. The system of claim 1, wherein the computer is further programmed to actuate a vehicle image sensor to provide image data for an area at a refueling side of the vehicle and, upon identifying a fuel spill from the image data, deactivate the fuel pump.

3. The system of claim 2, wherein the computer is further programmed to identify the fuel spill based on the image data by identifying a color difference on a roadway surface greater than a color difference threshold.

4. The system of claim 2, wherein the computer is further programmed to, upon identifying the fuel spill, actuate the vehicle to move away from the fuel spill.

5. The system of claim 2, wherein the computer is further programmed to obtain thermal image data from the image sensor.

6. The system of claim 5, wherein the computer is further programmed to identify the fuel spill when the thermal image data indicate a temperature difference on a roadway surface greater than a temperature difference threshold.

7. The system of claim 5, wherein the computer is further programmed to measure an ambient air temperature and to identify the fuel spill based on the thermal image data and the ambient air temperature.

8. The system of claim 1, wherein the computer is further programmed to disengage the fuel pump from the fuel tank upon deactivating the fuel pump.

9. The system of claim 1, wherein the computer is further programmed to instruct a side mirror to move toward a vehicle door.

10. The system of claim 2, wherein the computer is further programmed to identify a fuel door with the image sensor and actuate the vehicle image sensor to provide image data for an area within a predetermined distance of the fuel door.

11. A method, comprising:
receiving data indicating an amount of pumped fuel provided to a vehicle fuel tank of a vehicle while a fuel pump external to the vehicle provides fuel to the vehicle fuel tank;
detecting a change in a fuel volume of the vehicle fuel tank; and
upon determining that a difference between the pumped amount of fuel and the detected change exceeds a threshold, then, deactivating a fuel pump.

12. The method of claim 11, further comprising actuating a vehicle image sensor to provide image data for an area at a refueling side of the vehicle and, upon identifying a fuel spill from the image data, deactivating the fuel pump.

13. The method of claim 12, further comprising identifying the fuel spill based on the image data by identifying a color difference on a roadway surface greater than a color difference threshold.

14. The method of claim 12, further comprising, upon identifying the fuel spill, actuating the vehicle to move away from the fuel spill.

15. The method of claim 12, further comprising obtaining thermal image data from the image sensor.

16. The method of claim 15, further comprising identifying the fuel spill when the thermal image data indicate a temperature difference on a roadway surface greater than a temperature difference threshold.

17. The method of claim 15, further comprising measuring an ambient air temperature and identifying the fuel spill based on the thermal image data and the ambient air temperature.

18. The method of claim 11, further comprising disengaging the fuel pump from the fuel tank upon deactivating the fuel pump.

19. The method of claim 11, further comprising instructing a side mirror to move toward a vehicle door.

20. The method of claim 12, further comprising identifying a fuel door with the image sensor and actuating the vehicle image sensor to provide image data for an area within a predetermined distance of the fuel door.

* * * * *